United States Patent [19]

Andrews

[11] Patent Number: 5,707,674
[45] Date of Patent: Jan. 13, 1998

[54] METHOD OF MANUFACTURING BAKED FARINACEOUS FOODSTUFF PRODUCTS

[75] Inventor: Graham John Andrews, Peterborough, Great Britain

[73] Assignee: The Milton Keynes Process Limited, London, England

[21] Appl. No.: 571,917

[22] PCT Filed: Apr. 3, 1995

[86] PCT No.: PCT/GB95/00760

§ 371 Date: Dec. 29, 1995

§ 102(e) Date: Dec. 29, 1995

[87] PCT Pub. No.: WO95/30333

PCT Pub. Date: Nov. 16, 1995

[30] Foreign Application Priority Data

May 10, 1994 [GB] United Kingdom ............ 9409325
Jan. 16, 1995 [GB] United Kingdom ............ 9500760

[51] Int. Cl.⁶ .................................................. A21D 6/00
[52] U.S. Cl. ...................... 426/496; 426/243; 426/523
[58] Field of Search .................................. 426/523, 496, 426/524, 19, 243

[56] References Cited

U.S. PATENT DOCUMENTS 4,419,374 12/1983 Pei ............................................. 426/243
4,861,601 8/1989 Seneau ....................................... 426/496

FOREIGN PATENT DOCUMENTS 0 353 366 A1 2/1990 European Pat. Off..
1 413 481 11/1975 United Kingdom.
1 413 482 11/1975 United Kingdom.
2 005 980 5/1979 United Kingdom.

OTHER PUBLICATIONS

Applicant's Exhibit 1—International Publication Number WO 95/30333, including International Search Report, Inventor: Graham John Andrews, dated Nov. 16, 1995.

Applicant's Exhibit 2—U.K. Patent Office Search Report for Application No. GB 9409325.9, Search Examiner: K.J. Kennett, Search Completed: Sep. 23, 1994.

Applicant's Exhibit 3—Claims 1–17 considered by the British Examiner in Applicant's Exhibit 2.

*Primary Examiner*—George Yeung
*Attorney, Agent, or Firm*—Quarles & Brady

[57] ABSTRACT

A method of manufacturing bread products comprises the sequential steps of subjecting dough pieces to baking, the baking conditions being such that the crumb of each piece is fully developed but not the crust thereof in order to obtain partially baked bread pieces; exposing the partially baked bread pieces to a vacuum cooling stage; and, after a delay, subjecting the partially baked bread pieces to further heating, whereby the crust is fully developed and baked bread products result.

27 Claims, 1 Drawing Sheet

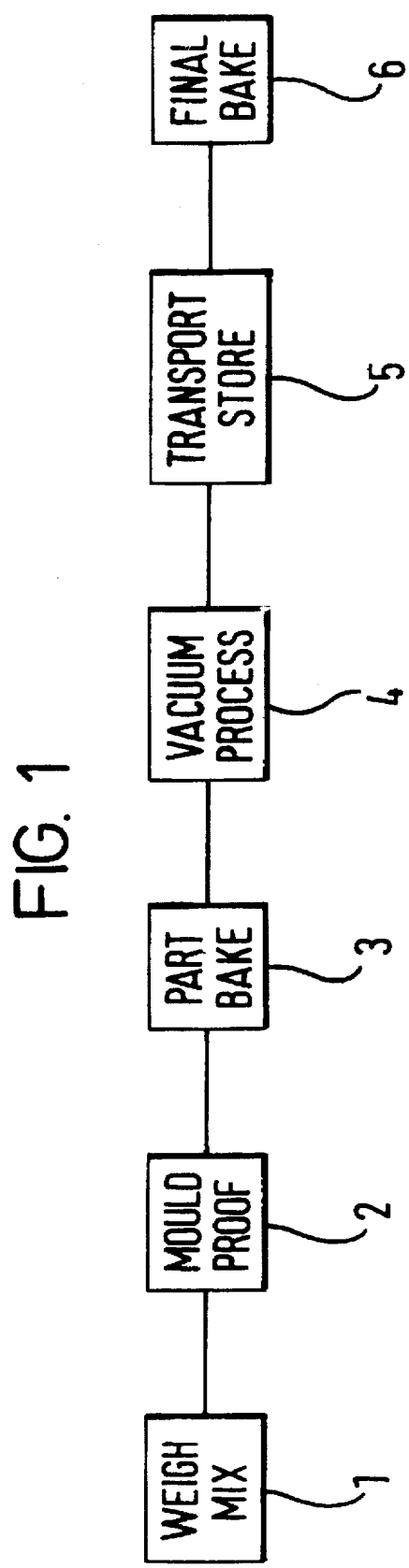

METHOD OF MANUFACTURING BAKED FARINACEOUS FOODSTUFF PRODUCTS

BACKGROUND OF THE INVENTION

A problem exists in high volume manufacture of bread products in the provision of freshly-baked, preferably hot/warm, bread products at the point of customer sale in the right quantities to meet day-by-day, and hour-by-hour demand which will vary.

Past methods of manufacture have attempted to solve the problem by part-baking of whole batches of bread products and then freezing the products prior to transportation to a location where final baking of part batches takes place. However, such methods have led to the manufacture of bread products which are difficult to handle and, in the case of 800 gram bread loaves, collapse when de-tinned.

Freezing of part-baked bread products can stabilise their shapes but introduces problems, some of which are related to refrigerated transport and storage. There are also problems relating to long final bake periods, and the necessity to defrost larger bread products prior to final bake.

When freezing part-baked bread products there is a moisture migration out of the bread. If the bread is frozen in the tin, the tin rapidly cools and the moisture condenses on the inside of the tin at the bread-tin surface. As an unacceptable crust on the product then results, it is necessary to de-tin the bread prior to freezing, but this leads to difficulties again as the lack of crust formation results in a soft product that, for larger products, is unsuitable for mechanical handling.

Smaller, non-frozen bread products have been manufactured which are gas-flushed and sealed after partial baking, in order to allow non-refrigerated transport and storage, but the products have not always retained the required inherent safety, or structural stability due to lack of crust development. Furthermore, the methods used are unsuitable for 800 gram bread.

Part-baked bread products have also been distributed without freezing and without special wrapping technology. Such products have also exhibited safety and stability problems and, like all methods of prior art identified herein, the products, when re-baked or re-heated, stale much more rapidly than traditional products.

SUMMARY OF THE INVENTION

According to one aspect of the invention, a method of manufacturing baked farinaceous foodstuff products comprises the steps of:

(a) subjecting dough pieces to baking, the baking conditions being so arranged that the crumb of each piece is fully baked, but the crust formation is incomplete, in order to obtain part-finished foodstuff pieces, (b) exposing the part-finished foodstuff pieces resulting from step (a), whilst still hot, to a sub-atmospheric environment whereby vacuum processing is employed to rapidly remove moisture and to develop the structure and strength of the crust of the foodstuff pieces, which are still part-finished, and, after a delay, (c) subjecting the part-finished foodstuff pieces resulting from step (b) to a further heating process whereby finished foodstuff products result.

According to a second aspect of the invention, a method of manufacturing baked, moisture-containing farinaceous foodstuff products comprises the steps of:

(a) subjecting dough pieces to baking, the baking conditions being a long duration low temperature bake so arranged that the crumb of each piece is fully baked, but the crust formation is incomplete, steam being applied to maintain humidity and prevent dehydration of the crust, in order to obtain part-finished foodstuff pieces, (b) exposing the part-finished foodstuff pieces resulting from step (a), whilst still hot, to a sub-atmospheric pressure environment whereby vacuum processing is employed to rapidly remove moisture and to develop the structure and strength of the crust of the foodstuff pieces, which remain part-finished, and, after a delay, (c) subjecting the part-finished foodstuff pieces resulting from step (b) to a further heating process whereby finished foodstuff products result.

The finished foodstuff products resulting from step (c) of both the first and second aspect of the invention are preferably products which the customers would consider to be conventionally-baked foodstuff products, It will be appreciated that some cooling of the product will take place under step (b) of both the first and second aspect of the invention but that further cooling may occur, or be required, before step (c). Preferably there is no deliberate cooling step between steps (a) and (b).

Although we refer to 'part-finished' foodstuff pieces in step (a), it should be appreciated that the crumb of a foodstuff piece is fully developed from the dough state to the foodstuff state, but that the crust is not fully developed, and the water content and the distribution of the water content is not the same as for the final product. Steps (b) and (c) are required to produce a product which has a fully developed crust, that is, a crust of suitable strength and, optionally, of a darker brown colour to that produced by step (a). The vacuum process of step (b) increases the crust strength of the foodstuff piece by a combination of moisture removal and internal pressure effects acting on the product without affecting a change in the colouration; this conditions the crumb to ensure the maintenance of a normal final product microbiological safety and shelf life with respect to staling after step (c).

In trials of the inventive process in relation to bread, the part-finished bread piece resulting from step (b) of the process behaves very much as a conventionally baked and cooled product but it has special properties of crumb structure and crust permeability that only become apparent when the product is subjected to step (c) of the process.

It is well known that a conventionally-baked bread product, if reheated, will subsequently stale very rapidly. Products produced by the inventive method, that is products resulting from step (c), do not stale as rapidly as such re-heated conventionally-baked products, in fact they behave much as a freshly-baked conventional product.

The processing of step (c) may be by means of conventional baking, that is heating the product externally, whereby the colouration of the crust is further developed from that produced under step (a).

However, the colouration that can be achieved is resultant from the caramelisation of the surface of the bread, and it is possible to achieve the full colouration required in step (a) without the full development of the crust. In this case step (c) will not further develop the colouration but will restore the product to a freshly-baked condition. Alternatively, heating means such as radio or microwave frequency heating may be employed alone or in combination with conventional heating especially, but not exclusively, if further colouration of the crust is possible but not desired.

By 'a delay' is meant a period suitable for the transportation of the part-finished foodstuff product to and storage at the site of the final step (c) of the process. This will be typically up to seven days for bread but other periods can be accommodated by employment of suitable environmentally-controlled storage conditions. The safety and stability in ambient conditions is a unique property of part-finished foodstuff products produced by the inventive process and is a unique feature of the total concept, whereby final products can be heated in small quantities and served hot to customers throughout the trading period. In general a small batch of part-finished products will be heated in an oven close to the point of sale or supply to the customer. The batch size will usually be smaller than the batch size for steps (a) and (b).

According to a third aspect of the invention we provide a method of manufacturing a part-finished farinaceous foodstuff product that is capable of being stored without freezing and subsequently heated to produce a finished baked moisture-containing farinaceous foodstuff product, the method comprising the steps of:

(a) subjecting dough pieces to baking, the baking conditions being so arranged that the crumb of each piece is fully baked, but the crust formation is incomplete, in order to obtain part-finished foodstuff pieces, (b) exposing the part-finished foodstuff pieces resulting from step (a), whilst still hot, to a sub-atmospheric environment whereby vacuum processing is employed to develop the structure and strength of the crust of the foodstuff pieces, in order to produce part-finished foodstuff pieces which are in a condition suitable for, and intended for, storage and subsequent heating to produce a finished foodstuff product.

According to a fourth aspect of the invention we provide a method of manufacturing a part-finished farinaceous foodstuff product that is capable of being stored without freezing and subsequently heated to produce a finished farinaceous foodstuff product, the method comprising the steps of:

(a) subjecting dough pieces to baking, the baking conditions being a long duration low temperature bake so arranged that the crumb of each piece is fully baked, but the crust formation is incomplete, steam being applied to maintain humidity and prevent dehydration of the crust, in order to obtain part-finished foodstuff pieces, (b) exposing the part-finished foodstuff pieces resulting from step (a), whilst still hot, to a sub-atmospheric pressure environment whereby vacuum processing is employed to rapidly remove moisture and to develop the structure and strength of the crust of the foodstuff pieces, in order to produce part-finished foodstuff pieces which are in a condition suitable for, and intended for, storage and subsequent heating to produce a finished foodstuff product.

A fifth aspect of the invention comprises finished foodstuff products manufactured by the method in accordance with the first aspect of the invention.

A sixth aspect of the invention comprises finished foodstuff products manufactured by the method in accordance with the second aspect of the invention.

A seventh aspect of the invention comprises part-finished foodstuff products manufactured by steps (a) and (b) of the method in accordance with the third aspect of the invention and intended for storage at ambient temperature and subsequent heating to produce a finished product.

An eighth aspect of the invention comprises part-finished foodstuff products manufactured by steps (a) and (b) of the method in accordance with the fourth aspect of the invention and intended for storage at ambient temperature and subsequent heating to produce a finished product.

A ninth aspect of the invention comprises such part-finished foodstuff products contained in wrapping bearing instructions to store the part-finished product at ambient temperatures and then to heat the product to produce a finished foodstuff product.

Preferably a flavour concentration process is used in which a fermented sponge, in either liquid or plastic state, is added to the original mix used to form the pieces subjected to the first baking step (a).

This has the benefit of compensating for constituents which may be removed from the foodstuff during the evaporation occurring in the vacuum chamber.

To assist in the presentation of the part-finished product, a preservative may be sprayed on the surface of the part-finished product after leaving the vacuum chamber of step (b) of the process, so as to suppress mould growth.

Such preservatives are already known, however, by applying this to the part-finished product the preservative could be removed by volatilisation in the final baking step of the process.

According to a tenth aspect of the invention, a method of manufacturing baked moisture-containing farinaceous foodstuff products comprises the steps of:

(a) subjecting dough pieces to baking, the baking conditions being a long duration low temperature bake so arranged that the crumb of each piece is fully baked, but the crust formation is incomplete, in order to obtain part-finished foodstuff pieces, (b) exposing the part-finished foodstuff pieces resulting from step (a), whilst still hot, to a sub-atmospheric pressure environment whereby vacuum processing is employed to remove moisture and to develop the structure and strength of the crust of the foodstuff pieces, which remain part-finished, (c) after a delay, subjecting the part-finished foodstuff pieces resulting from step (b) to a further heating process whereby finished foodstuff products result, and (d) wrapping the finished products ready for sale.

According to an eleventh aspect of the invention, a method of manufacturing baked moisture-containing farinaceous foodstuff products comprises the steps of:

(a) at a first baking location subjecting dough pieces to baking, the baking conditions being a long duration low temperature bake so arranged that the crumb of each piece is fully baked, but the crust formation is incomplete, in order to obtain part-finished foodstuff pieces, (b) exposing the part-finished foodstuff pieces resulting from step (a), whilst still hot, to a sub-atmospheric pressure environment whereby vacuum processing is employed to remove moisture and to develop the structure and strength of the crust of the foodstuff pieces, which remain part-finished, (c) distributing said part-finished foodstuff pieces from said first location to a plurality of second baking locations remote from said first baking location and, (d) at each of said second baking locations subjecting the part-finished foodstuff pieces resulting from step (b) to a further heating process whereby finished foodstuff products result ready for sale.

According to a twelfth aspect of the invention, a method of manufacturing baked moisture-containing farinaceous foodstuff products comprises the steps of:

(a) subjecting dough pieces to baking at a first location, the baking conditions being so arranged that the crumb of each piece is fully baked, but the crust formation is incomplete, in order to obtain part-finished foodstuff pieces, (b) exposing the part-finished foodstuff pieces resulting from step (a), whilst still hot, to a sub-atmospheric pressure environment whereby vacuum processing is employed to remove moisture and to develop the structure and strength of the crust of the foodstuff pieces and provide part-finished products having staling retarding properties, and (c) using said staling retarding properties by, after a delay, subjecting the part-finished foodstuff pieces resulting from step (b) to a further heating process at a second location whereby finished foodstuff products result ready for sale and having substantially the same characteristics as conventionally baked farinaceous foodstuff product.

The invention in all of its aspects is applicable to a whole range of baked, moisture-containing farinaceous foodstuffs and is particularly applicable to bread products.

One method of manufacturing bread products in accordance with the invention will now be described, by way of example only with reference to the accompanying drawings.

BRIEF DESCRIPTION OF THE DRAWING

FIG. 1 is a block flow diagram of a process in accordance with the invention.

With reference to FIG. 1, bread dough is mixed and formed into weighed pieces, block 1, placed into tins and proved, block 2, in a conventional manner but controlled to non-conventional parameters. The pieces of dough are then subjected to baking, block 3, in a multi-zone oven which provides variable environments. Such ovens are well known to the skilled man and need not be further described. The baking profile is set within the range of 40–45 minutes at 140°–150° C., so as to achieve a core temperature of 94°–96° C.

Each oven zone of the variable environment oven is separately controlled. Typically the first zone uses a mixture of steam and non-steam heat for 6 to 7 minutes with the remainder of the baking zones or environments providing heat only. The process fully develops, ie bakes, the crumb without significant development of the crust or colouring thereof. Traditional baking parameters would be 20–25 minutes at 225°–250° C. with a 2 minute steam-only environment.

Development of the dough starts at mixing with the hydration of the flour gluten with water. This gives the dough its structure. Proving (action of the yeast) further develops the structure. Baking kills the yeast and sets the crumb structure.

The part-finished bread pieces thus obtained are removed from the oven and then exposed whilst hot, and preferably without any deliberate pre-cooling step, to a sub-atmospheric environment, block 4, whereby vacuum processing is employed to structurally develop a crust and condition the crumb, thereby setting the shape of the pieces without imparting additional colour, and to establish the ratio of moisture to solids in the part-finished bread such that the part-finished product is suitable for a maximum delay period, without compromising product quality, until final bake, and such that the weight of the final product after the final baking step should lie within acceptable limits.

The part-finished bread pieces may remain in their tins during exposure to the vacuum step of the process.

The part-finished bread pieces are transferred directly from the oven into the vacuum chamber as quickly as possible and with the minimum loss of temperature (for example less than 10° C. temperature loss in the crumb) between leaving the oven and entering the vacuum chamber. Because of the plastic state of the crust the transfer is effected quickly enough to prevent physical collapse of the bread piece prior to entry into the vacuum chamber. On entry into the vacuum chamber the reduced pressure surrounding the exterior of the crust creates a pressure differential relative to the steam within the bread piece so that the internal pressure is sufficient to keep the bread piece expanded into its desired shape while the vacuum cooling progresses. The effect of treatment in the vacuum chamber is to carry out vacuum evaporation of further moisture from the bread. As this evaporation occurs the crust region reaches a point of dehydration where the crust sets and achieves a physical stability sufficient to maintain the bread shape once the bread has been removed from the vacuum chamber.

The part-finished bread pieces can now be mechanically de-tinned and handled, stored and/or transported at ambient temperatures, block 5, as a result of the formation of the induced crust. This comprises the delay period of the method of manufacture. The length of the 'delay period' of block 5 depends on the hour-by-hour, day-by-day demand from the customer. Preferably the length of the delay period is no more than seven days.

The third and final step of the method will usually take place at the point of sale. The part-finished bread pieces are now baked on a short cycle, typically 6–14 minutes at 200°–220° C., so as to generate a bread piece core temperature of at least 557° C. This further stage is sufficient to fully refresh the crumb and develop normal crust colouring and structure, whereby good quality finished products result that have a conventional customer shelf life with respect to staling and/or mould growth and that additionally behave as normally baked loaves in respect of pathogen growth or toxin formation.

With prior art processes mentioned earlier, when freezing part-baked bread products there is a moisture migration out of the bread. If the bread were to be frozen in the tin, the tin would rapidly cool and the moisture would condense on the inside of the tin at the bread-tin surface. As an unacceptable crust on the product would then results, it is necessary to de-tin the bread prior to freezing, and this leads to difficulties as the lack of crust formation results in a soft product unsuitable for mechanical handling for larger products.

Traditional baking practice thus tends to lead one away from any baking process that does not develop a sufficient crust to survive the de-tinning process and the subsequent handling necessary to freeze the product.

In part-bake-gas-flush-and-wrap or part-bake-vacuum-wrap processes, sufficient crust must be developed in the first bake to enable handling. This is acceptable for small products such as baguettes, but not for 800 gram bread, where the crust development would need to be almost complete.

The vacuum processing step used by the present invention extracts a controlled mass of moisture from the hot bread but, in particular, the tins do not cool to a point where condensation occurs. Hence the vacuum processing step can be undertaken with bread in the tin, whereby the structure and strength of the crust is developed without adding colour before the product is de-tinned, producing a part-finished product with a stable shape after de-tinning.

The above-described exemplary process relates to the manufacture of 800 gram bread loaves. Baking parameters for block 3 to suit the production of other part-finished bread products are as follows:

Bread Rolls : 14–18 minutes at baking temperatures between 140° C. and 200° C.

French Sticks: 16–20 minutes at baking temperatures between 140° C. and 200° C.

400 Gram Bread: 30–40 minutes at baking temperatures between 140° C. and 200° C.

For the first bake process, the maximum temperature is determined by the size and mass of the product and the mass of moisture loss required for correct final product weight control and by the amount of crust colouration required at the first bake step (a) in relation to the amount of crust colouration required in the final step (c) and the attainment of the correct product core temperatures at both stages.

I claim:

1. A method of manufacturing baked farinaceous foodstuff products comprising the steps of:
   a) subjecting dough pieces to baking, the baking conditions being so arranged that a crumb of each piece is fully baked, but a crust formation is incomplete, in order to obtain partially baked farinaceous foodstuff pieces,
   b) prior to wrapping, placing the partially baked farinaceous foodstuff pieces resulting from step (a), whilst still hot, into a vacuum cooling chamber in which a vacuum environment rapidly removes moisture and develops structure and strength of the crust of the foodstuff pieces, which are still partially baked, and, after a delay,
   c) subjecting the partially baked farinaceous foodstuff pieces resulting from step (b) to a further heating process whereby baked farinaceous foodstuff products result.

2. A method according to claim 1 in which steam is applied during step (a) to maintain humidity and prevent dehydration of the crust.

3. A method according to claim 1 in which the baking conditions of step (a) are carried out at a temperature not in excess of 200° C., steam being applied during step (a) to maintain humidity and prevent dehydration of the crust.

4. A method according to claim 3 in which the duration of baking in step (a) is at least 20 minutes.

5. A method according to claim 1 in which the baking conditions of step (a) are carried out at a temperature not in excess of 150° C. for a period of at least 40 minutes, steam being applied during step (a) to maintain humidity and prevent dehydration of the crust.

6. A method according to claim 1 in which, after step (a), the partially baked farinaceous foodstuff pieces are transferred directly into the vacuum environment of step (b) with no substantial temperature fall before entry into the vacuum environment.

7. The method of claim 1 in which there is no active cooling step between steps (a) and (b).

8. The method of claim 1 wherein the process of step (c) employs radio frequency heating means.

9. The method of claim 1 wherein the process of step (c) employs microwave frequency heating means.

10. The method according to claim 1 wherein the period of said delay is not more than seven days in ambient storage conditions.

11. The method according to claim 1, wherein the period of delay is in excess of seven days in appropriate storage conditions.

12. The method according to claim 3, wherein the farinaceous foodstuff product is bread, and wherein step (a) takes place over a period of 14 to 40 minutes at 140°–200° C.

13. The method of claim 12, wherein the product is bread rolls and step (a) takes place over a period of 14 to 18 minutes.

14. The method of claim 12, wherein the product is French sticks and step (a) takes place over a period of 16 to 20 minutes.

15. The method of claim 12, wherein the product is 400 gm bread and step (a) takes place over a period of 30 to 40 minutes.

16. The method according to claim 1, wherein step (a) takes place in an oven in which a baking temperature and humidity are variable.

17. The method of claim 16, wherein a first environment of the oven is provided by a mixture of steam and non-steam heat.

18. The method of claim 17 wherein remaining environments of the oven are provided by non-steam heat only.

19. The method of claim 1, wherein step (c) is so arranged as to generate a foodstuff piece core temperature of at least 55° C.

20. The method of claim 1, wherein the foodstuff product is bread and wherein step (c) takes place for 6 to 14 minutes at 200° C.–250° C.

21. A method according to claim 1 wherein a fermented sponge, in either liquid or plastic state, is added to a mix used to form the pieces subjected to the first baking step (a) of the process.

22. A method according to claim 1 wherein a preservative is sprayed on the surface of the partially baked farinaceous product after leaving the vacuum chamber of step (b) of the process.

23. A method of manufacturing a partially baked farinaceous foodstuff product that is capable of being stored without freezing and subsequently heated to produce a fully baked moisture-containing farinaceous foodstuff product, the method comprising the steps of:
   a) subjecting dough pieces to baking, the baking conditions being so arranged that a crumb of each piece is fully baked, but a crust formation is incomplete, in order to obtain partially baked farinaceous foodstuff pieces,
   b) prior to wrapping, placing the partially baked farinaceous foodstuff pieces resulting from step (a), whilst still hot, into a vacuum cooling chamber in which a vacuum environment develops structure and strength of the crust of the foodstuff pieces in order to produce partially baked farinaceous foodstuff pieces which are in a condition suitable for storage and subsequent heating to produce a baked farinaceous foodstuff product.

24. A method of manufacturing a partially baked farinaceous foodstuff product that is capable of being stored without freezing and subsequently heated to produce a baked farinaceous foodstuff product, the method comprising the steps of:
   a) subjecting dough pieces to baking, the baking conditions being so arranged that a crumb of each piece is fully baked, but a crust formation is incomplete, steam being applied to maintain humidity and prevent dehydration of the crust, in order to obtain partially baked farinaceous foodstuff pieces,
   b) prior to wrapping, placing partially baked farinaceous foodstuff pieces resulting from step (a), whilst still hot, into a vacuum cooling chamber in which a vacuum environment rapidly removes moisture and develops structure and strength of the crust of the foodstuff pieces, in order to produce partially baked farinaceous foodstuff pieces which are in a condition suitable for storage and subsequent heating to produce a baked farinaceous foodstuff product.

25. A method of manufacturing baked moisture-containing farinaceous foodstuff products comprising the steps of:
- a) subjecting dough pieces to baking, the baking conditions being so arranged that a crumb of each piece is fully baked, but a crust formation is incomplete, in order to obtain partially baked farinaceous foodstuff pieces,
- b) prior to wrapping, placing the partially baked farinaceous foodstuff pieces resulting from step (a), whilst still hot, into a vacuum cooling chamber which rapidly removes moisture and develops structure and strength of the crust of the foodstuff pieces, which remain partially baked,
- c) after a delay, subjecting the partially baked farinaceous foodstuff pieces resulting from step (b) to a further heating process whereby baked farinaceous foodstuff products result, and
- d) wrapping the baked farinaceous products ready for sale.

26. A method of manufacturing baked moisture-containing farinaceous foodstuff products comprising the steps of:
- a) at a first baking location subjecting dough pieces to baking, the baking conditions being so arranged that a crumb of each piece is fully baked, but a crust formation is incomplete, in order to obtain partially baked farinaceous foodstuff pieces,
- b) prior to wrapping, placing the partially baked farinaceous foodstuff pieces resulting from step (a), whilst still hot, into a vacuum cooling chamber in which a vacuum environment removes moisture and develops structure and strength of the crust of the foodstuff pieces, which remain partially baked,
- c) distributing said partially baked farinaceous foodstuff pieces from said first location to a plurality of second baking locations remote from said first baking location and,
- d) at each of said second baking locations subjecting the partially baked farinaceous foodstuff pieces resulting from step (b) to a further heating process whereby baked farinaceous foodstuff products result ready for sale.

27. A method of manufacturing baked moisture-containing farinaceous foodstuff products comprises the steps of:
- a) subjecting dough pieces to baking at a first location, the baking conditions being so arranged that a crumb of each piece is fully baked, but a crust formation is incomplete, in order to obtain partially baked farinaceous foodstuff pieces,
- b) prior to wrapping, placing the partially baked farinaceous foodstuff pieces resulting from step (a), whilst still hot, into a vacuum cooling chamber which removes moisture, develops structure and strength of the crust of the foodstuff pieces and provides partially baked farinaceous products having staling retarding properties, and
- c) after a delay, subjecting the partially baked farinaceous foodstuff pieces resulting from step (b) to a further heating process at a second location whereby baked farinaceous foodstuff products result ready for sale and having substantially the same characteristics as conventionally baked farinaceous foodstuff product.

* * * * *